United States Patent Office 2,988,068
Patented June 13, 1961

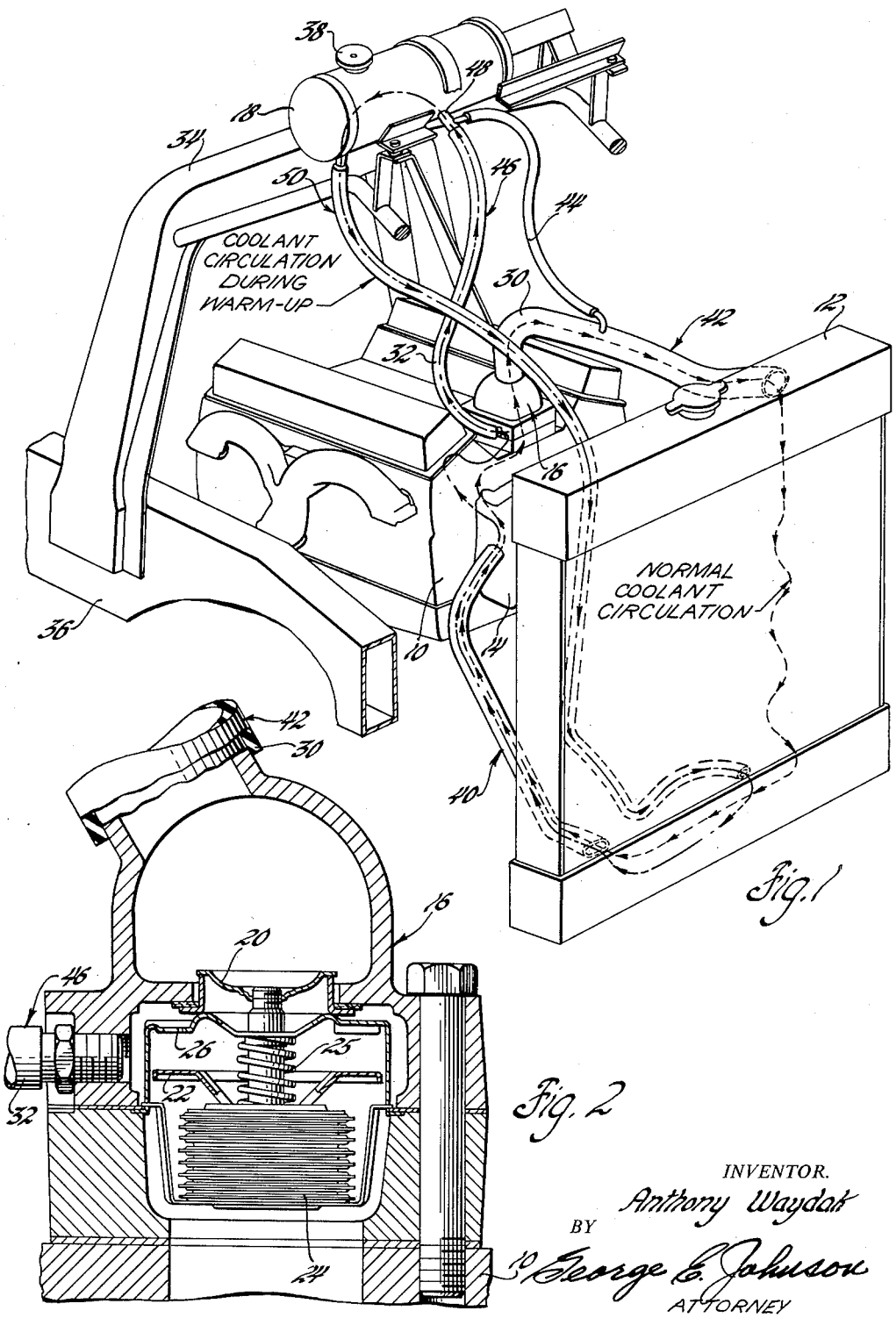

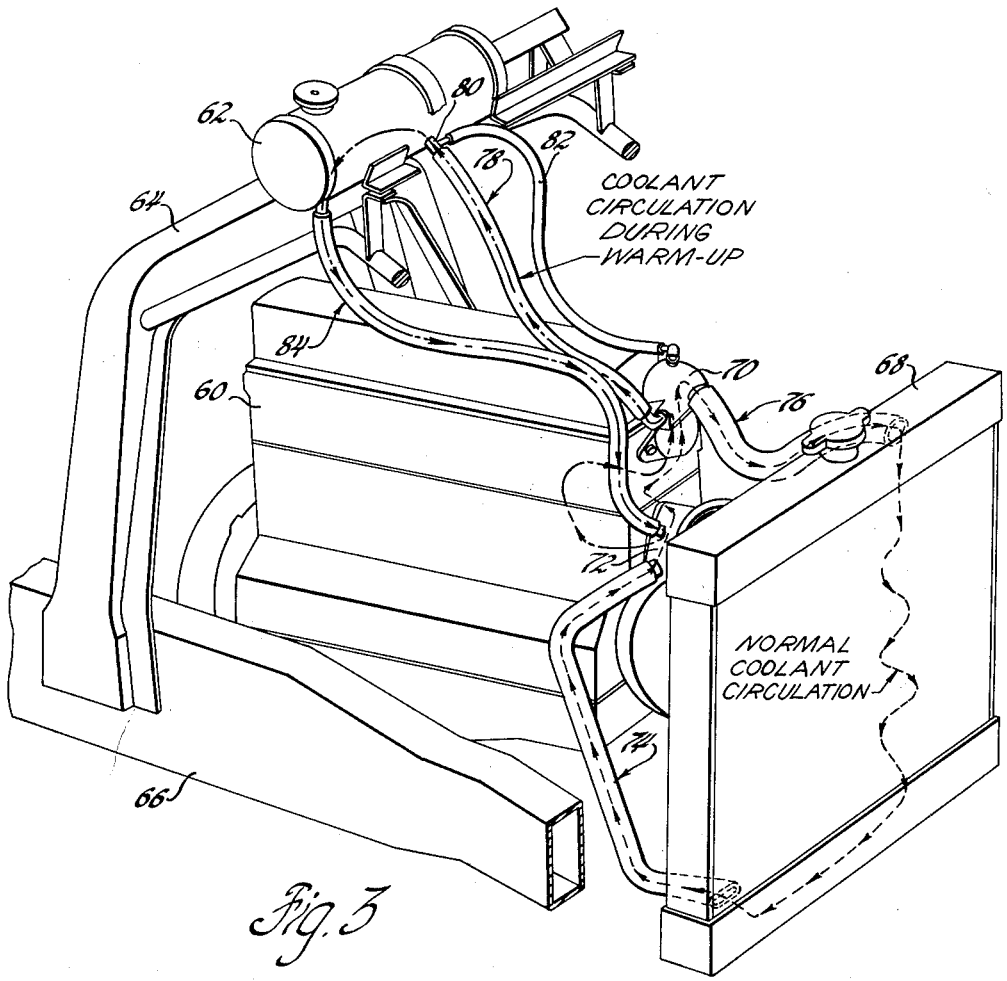

2,988,068
ENGINE COOLING SYSTEM
Anthony Waydak, Birmingham, Mich., assignor to General Motors Corporation, Detroit, Mich., a corporation of Delaware
Filed July 22, 1960, Ser. No. 44,690
7 Claims. (Cl. 123—41.1)

This invention relates to cooling systems and more particularly to systems for cooling jacketed internal combustion engines by means of a liquid coolant.

In order to secure sufficient cooling capacity for liquid cooled internal combustion engines on some vehicles, it has been found necessary to incorporate surge tanks connected to the coolant system by suitable conduits. Such surge tanks provide extra capacity for coolant and assure effective cooling despite vehicle operation under adverse conditions. It has been found, however, that the extra capacity of coolant has involved the entrainment and entrapment of air thereby detracting from the desired efficiency of the cooling system. Air does not transmit heat as well as water and the presence of air accelerates corrosion within the cooling system. More air appears in the coolant when cold than when at operative engine temperature. It is obvious that an effective way of removing the air from the coolant is desirable especially when a surge tank is utilized.

A feature of the present invention is an engine cooling system having a surge tank located higher than a radiator serving the engine and connected to the engine jacket by a thermostatic by-pass valve only during engine warm-up conditions.

To this end, a feature of this invention is an improved engine cooling system with a two-way thermostatic valve associated with an engine jacket to direct coolant from the jacket through a surge tank during engine warm-up conditions and to direct engine coolant through the radiator under normal engine operating temperature. Another feature is a means for venting a cooling system through a surge tank without involving the radiator.

These and other important features of the invention will now be described in detail in the specification and then pointed out more particularly in the appended claims.

In the drawings:

FIGURE 1 is a diagrammatic view in perspective of an eight cylinder engine associated with a radiator and surge tank for use in a cab over engine truck;

FIGURE 2 is a sectional view through a thermostatic valve and a portion of an engine block as shown in FIGURE 1; and FIGURE 3 is a view somewhat like that of FIGURE 1 but with an in-line six cylinder engine and a modified cooling circulation system including a surge tank being illustrated.

In FIGURE 1, the exterior of an engine jacket 10 of a V-8 type of internal combustion engine is disclosed. The coolant of the engine is adapted to be circulated through a radiator 12, a pump 14 and a thermostatic valve 16 as well as a surge tank 18. The radiator 12 is in front of the engine as is conventional. The surge tank 18, however, is above the radiator 12 and placed in a location suitable for use in a cab-over engine type of truck. The pump 14 is not shown in detail as it is conventional and it is conventionally mounted on the front of the engine to be driven thereby with its discharge end communicating with the engine jacket 10.

The thermostatic valve 16 is illustrated in considerable detail in FIGURE 2. It comprises a main poppet-type valve 20 and a supplementary valve 22 as well as a temperature sensitive bellows 24 and a closing spring 25. There are a number of ports such as 26 in the valve 16 which are adapted to be closed by the supplementary valve 22 when the latter is raised by the bellows 24 with a simultaneous opening of the main valve 20. Being a two-way by-pass valve, one discharge connection from the valve 16 is by way of a hose 30. When the valve 20 is open, the flow will be from the engine jacket 10 to the hose 30. When the valve 20 is closed as shown in FIGURE 2, the ports 26 will be open and discharge from the valve 16 will be by way of a hose 32. Further details regarding the thermostatic valve are not given herein as they form no part of the present invention. The valve itself is more fully described in the United States Patent No. 2,899,026, granted August 11, 1959, in the names of P. E. Hitch and J. W. Walsh. Obviously, other types of thermostatically-operated by-pass valves could be used in carrying out the present invention.

The surge tank 18 is mounted on bracket structure indicated at 34 which in turn is fixed to the frame 36 of the vehicle. The tank is provided with a vent cap 38 by means of which the supply of coolant may be replenished and also by means of which air may be vented from the system to the atmosphere.

The bottom tank of the radiator 12 is connected by means of a first conduit, generally indicated at 40, to the pump 14 from which the coolant is introduced into the jacket 10. A second conduit, generally indicated at 42, which includes the hose 30, connects the top tank of the radiator to the valve 16. A vent line 44 connects a high point of the second conduit 42 to the surge tank 18. A third conduit generally indicated at 46, including the hose 32, connects the valve 16 to the surge tank 18. The joinder of the vent line 44 and the third conduit 46 to the surge tank is conveniently by way of a Y-connection 48. A fourth conduit generally indicated at 50 connects the surge tank 18 to the lower tank of the radiator 12 at a point spaced from the inlet end of the first conduit 40.

In operation of the system of FIGURE 1 and assuming that the engine has been started while cold, the circulation of the engine coolant will be as shown by the dot-and-dash lines. This flow is in substantial quantity and is brought about by the closure of the main valve 20 and the opening of the ports 26 as effected by the expansion of the spring 25 and contraction of the bellows 24. Under these circumstances, the major portion of the radiator 12 is by-passed by the coolant flow during warm-up but the surge tank 18 is definitely included in an effective circulation through the engine jacket. The coolant will flow in volume from the jacket 10 and by way of the third conduit 46 to the surge tank 18 and then by way of the fourth conduit 50 to the radiator 12 for recirculation through the first conduit 40 and the pump 14. During this period when air is present to the greatest extent in the coolant, ample opportunity is given for the air to escape from the system by way of the surge tank 18 and the vent cap 38. Most of the air will have escaped by the time the valve 16 opens upon expansion of the bellows 24 as normal engine-operating temperature is attained.

When the main valve 20 opens and the supplementary valve 22 closes for normal engine operation, the coolant flow will be as shown in the dotted arrows, the coolant flowing upwardly by way of the second conduit 42 to the radiator 12 and downwardly through the radiator core and by way of the first conduit 40 to the pump 14 for recirculation through the engine jacket 10. The only connection with the surge tank 18 under such conditions will be by the vent line 44 which will pass a restricted volume of coolant to the tank 18 and any air remaining in the system to atmosphere.

In FIGURE 3, a six cylinder engine 60 is shown with a surge tank 62 located above it and positioned on a supporting structure 64 fixed to the frame 66 of the vehicle. A conventional radiator 68 is mounted forwardly of the engine and a thermostatic two-way by-pass valve 70, similar to the valve 16, is associated with the engine jacket for passing coolant either to the radiator 68 or directing the coolant to the surge chamber 62. A coolant pump 72 is located on the front of the engine between the latter and the radiator 68. A first conduit 74 connects a lower tank of the radiator 68 to the inlet of the pump 72. A second conduit 76 connects the thermostatic valve 70 to the top tank of the radiator 68. A third conduit 78 connects the valve 70 to the surge tank and to this end a Y-connection 80 is employed to also serve as a connector for a vent line 82 which leads from the top of the thermostatic valve 70 which happens to be above the second conduit 76. A fourth line 84 connects the tank 62 to the inlet side of the pump 72.

In the operation of the arrangement shown in FIGURE 3, normal engine coolant circulation is shown by the dotted-line arrows and it will be noted that the engine coolant after passing downwardly through the radiator goes through the first conduit 74 into the pump 72 and through the jacket of the engine 60 and then upwardly through the valve 70 and back to the radiator by way of the second conduit 76. The surge tank receives a restricted amount of coolant by way of the vent line 82 during normal engine temperature operation.

During engine warm-up, however, the engine coolant flows in substantial volume in the directions indicated by the dot-and-dash arrows. The coolant is discharged by the pump 72 into the engine jacket and from there the engine coolant flows into the valve 70 and by-passes the radiator by being directed in the third conduit 78 to the surge tank. Coolant is then returned by way of a fourth conduit 84 to the inlet side of the pump 72.

From this description of both modifications it may be seen that the radiator 12 or 68 is substantially or entirely excluded from the effective circulation system for the coolant and that the surge tank 18 or 62 is definitely and positively included therein during engine warm-up. During normal engine temperature, the surge tank 18 or 62 is excluded from the effective circulating part of the system except for the limited flow through the vent line 44 or 82 respectively.

I claim:

1. An engine cooling system comprising an engine jacket, a radiator, a pump, a surge tank located higher than the radiator, a two-way thermostatic valve, a first conduit connecting one portion of said radiator to said pump and jacket in series, a second conduit connecting said valve to another portion of said radiator for normal coolant circulation, a third conduit connecting said valve to said surge tank as a by-pass of said second conduit and radiator, and a fourth conduit connecting said surge tank to said system upstream from said jacket.

2. An engine cooling system comprising an engine jacket, a radiator, a pump, a surge tank located higher than the radiator, a two-way thermostatic valve associated with said jacket, a first conduit connecting one portion of said radiator to said pump jacket and valve in series, a second conduit connecting said valve to another portion of said radiator for normal coolant circulation, a vent line connecting said second conduit to said surge tank, a third conduit connecting said valve to said surge tank as a by-pass of said second conduit and radiator, a fourth conduit connecting said surge tank to said system upstream from said jacket, and means for venting air from said surge tank to the atmosphere.

3. An engine cooling system comprising an engine jacket, a radiator, a pump, a surge tank located higher than the radiator, a two-way thermostatic valve associated with said jacket, a first conduit connecting one portion of said radiator to said pump jacket and valve in series, a second conduit connecting said valve to another portion of said radiator for normal coolant flow to the latter, the third conduit connecting said valve to said surge tank as a by-pass of said second conduit and radiator, and a fourth conduit connecting said surge tank to said radiator upstream from the said first conduit.

4. An engine cooling system such as set forth in claim 3, said conduits each having a substantial flow capacity, and a vent line having a restricted flow capacity connecting said second conduit to said surge tank.

5. An engine cooling system comprising an engine jacket, a radiator, a pump, a surge tank located higher than the radiator, a two-way thermostatic valve associated with said jacket, a first conduit connecting one portion of said radiator to said pump and jacket in series, a second conduit connecting said valve to another portion of said radiator for normal coolant circulation, a third conduit connecting said valve to said surge tank as a by-pass of said second conduit and radiator, and a fourth conduit connecting said surge tank upstream of said pump and jacket and downstream from said first conduit.

6. An engine cooling system as set forth in claim 5, said conduits each having a substantial flow capacity, a vent line having a smaller flow capacity connecting said second conduit to said surge tank.

7. An engine cooling system comprising an engine jacket, a radiator to one side of said jacket, a pump associated with said jacket and located between the latter and said radiator, a surge tank located above the radiator and jacket, a two-way thermostatic valve mounted on said jacket and communicating with the latter, a first conduit connecting one portion of said radiator to said pump jacket and valve in series and in that order, a second conduit connecting said valve to another portion of said radiator for normal coolant circulation, a third conduit connecting said valve to said surge tank as a by-pass of said second conduit and radiator, a fourth conduit connecting said surge tank to said system upstream from said pump, a vent line connecting said second conduit to said surge tank, a vent cap on said surge tank for venting entrapped air to the atmosphere, and said vent line having a limited flow capacity compared with each of said conduits.

No references cited.